(12) United States Patent
Scott et al.

(10) Patent No.: US 9,477,660 B2
(45) Date of Patent: Oct. 25, 2016

(54) PRIVACY COMPLIANCE IN DATA RETRIEVAL

(75) Inventors: April A. Scott, Concord, CA (US);
AnnCharlot H. Harvey, Charlotte, NC (US); Noufal Edappanoli, Guadalajara (MX); Bharani Shangar Padmanabhan, Concord, CA (US); Asim I. Haque, Concord, CA (US); Paul E. Hardstone, Pleasant Hill, CA (US)

(73) Assignee: Bank of America Corporation, Charlotte, NC (US)

( * ) Notice: Subject to any disclaimer, the term of this patent is extended or adjusted under 35 U.S.C. 154(b) by 572 days.

(21) Appl. No.: 13/204,375

(22) Filed: Aug. 5, 2011

(65) Prior Publication Data

US 2013/0036110 A1 Feb. 7, 2013

(51) Int. Cl.
*G06F 17/30* (2006.01)
*G06F 21/62* (2013.01)
*G06F 21/55* (2013.01)

(52) U.S. Cl.
CPC ............ *G06F 17/30* (2013.01); *G06F 21/552* (2013.01); *G06F 21/6218* (2013.01)

(58) Field of Classification Search
CPC .................................................. G06F 21/6218

USPC ........................................................ 707/748
See application file for complete search history.

(56) References Cited

U.S. PATENT DOCUMENTS

| | | | |
|---|---|---|---|
| 2006/0129813 A1* | 6/2006 | Narayanan et al. ........... | 713/168 |
| 2006/0201432 A1* | 9/2006 | Pratt ........................... | 119/51.02 |
| 2006/0265599 A1* | 11/2006 | Kanai ........................... | 713/182 |
| 2007/0220004 A1* | 9/2007 | Fifield et al. ................... | 707/9 |
| 2010/0042846 A1* | 2/2010 | Trotter et al. ................. | 713/182 |
| 2010/0064342 A1* | 3/2010 | Nakagawa ..................... | 726/1 |

\* cited by examiner

*Primary Examiner* — Alexey Shmatov
*Assistant Examiner* — Kurt Mueller
(74) *Attorney, Agent, or Firm* — Banner & Witcoff, Ltd.; Michael A. Springs (57) ABSTRACT

Data may be retrieved from databases using various types of code, functions and programs. To insure that the code, functions and programs comply with privacy requirements and regulations, the code and programs may be audited. In one example, an activity log may be queried to identify code that was executed to retrieve and display database information. A system may then determine whether an unauthorized entity was able to retrieve and/or view the database information. If so, the code or program may be labeled as non-compliant. Alternatively or additionally, a system may parse data retrieval code to determine whether privacy protection code is included therein. If not, the code may be deemed non-compliant. Reports may be generated identifying the non-compliant data retrieval code or function and, in some arrangements, specifying compliance statistics.

15 Claims, 6 Drawing Sheets

| REPORT NUMBER | REPORT DATE | GENERATED BY | ENVIRONMENT | VIEW DATABASE NAME | VIEW NAME | PRIVACY PROTECTION | PRIVACY COMPLIANT | BASE VIEW | X VIEW | VIEW CREATION DATE |
|---|---|---|---|---|---|---|---|---|---|---|
| | | | | | | | | | | |
| | | | | | | | | | | |
| | | | | | | | | | | |

FIG. 4A

| # OF NON-PRIVACY VIEWS | # OF PRIVACY PROTECTED COLUMNS | CODE GENERATED BY | PRIVACY CODE VERSION | SIMPLE VIEW ON TABLE |
|---|---|---|---|---|
| | | | | |
| | | | | |
| | | | | |

PRIVACY COMPLIANCE IN DATA RETRIEVAL

BACKGROUND

While electronic data has improved ease of information access and distribution, privacy and security concerns have come into focus. Customers, employees, organizations and other entities are all eager to maintain adequate protection of their private information from unauthorized and unnecessary access. In some instances, privacy requirements are defined as a set of regulations and specifications. In other instances, technological measures are implemented to provide information privacy and security.

SUMMARY

Aspects of the disclosure provide information privacy auditing to identify non-compliant data access. The non-compliant data access may then be reported for correction and/or suspension.

According to one or more aspects, a catalog of data access code such as views may be maintained. To evaluate the privacy compliance of the data access code, in some arrangements, the data retrieval code and/or programs may be parsed to identify whether privacy code is included therein. The catalog of data retrieval and access code may be a copy of a main catalog so that that the main catalog does not experience additional processing load. Additionally or alternatively, a compliance report may be generated. For example, the report may provide compliance statistics to aid in identifying areas requiring compliance improvement.

According to another aspect, identification of non-compliant data access may include determining whether data retrieved by a user (e.g., using database code) is subject to privacy requirements. If so, a system may further determine whether the user is authorized to retrieve and/or view the data. If the user is not authorized, the system may determine that the database code used to retrieve the data is non-compliant and require correction or deletion of the code. Other or additional repercussions may be used in response to determining data retrieval code is non-compliant with privacy requirements.

According to some aspects, auditing of database retrieval code may be triggered based upon a request to migrate or implement the code to a live operating environment.

This summary is provided to introduce a selection of concepts in a simplified form that are further described below in the Detailed Description. The Summary is not intended to identify key features or essential features of the claimed subject matter, nor is it intended to be used to limit the scope of the claimed subject matter.

BRIEF DESCRIPTION OF THE DRAWINGS

The foregoing summary of the claimed subject matter, as well as the following detailed description of illustrative embodiments, is better understood when read in conjunction with the accompanying drawings, which are included by way of example, and not by way of limitation with regard to the claimed subject matter.

DETAILED DESCRIPTION

In the following description of various illustrative embodiments, reference is made to the accompanying drawings, which form a part hereof, and in which is shown, by way of illustration, various embodiments in which the claimed subject matter may be practiced. It is to be understood that other embodiments may be utilized and structural and functional modifications may be made without departing from the scope of the present claimed subject matter.

Organizations and individuals regularly generate and process sensitive information including customer information, privacy memoranda, security codes, settlement terms, negotiation information and the like. In many instances, such information is stored in a database to allow access and retrieval as needed and privacy requirements are defined to protect the sensitive nature of the information. In some cases, privacy requirements may be defined by government regulations, company rules, customer requests, public opinion and the like. The various aspects described herein provide for privacy and security auditing of data retrieval to insure compliance with privacy and security regulations and requirements.

Figure 1:
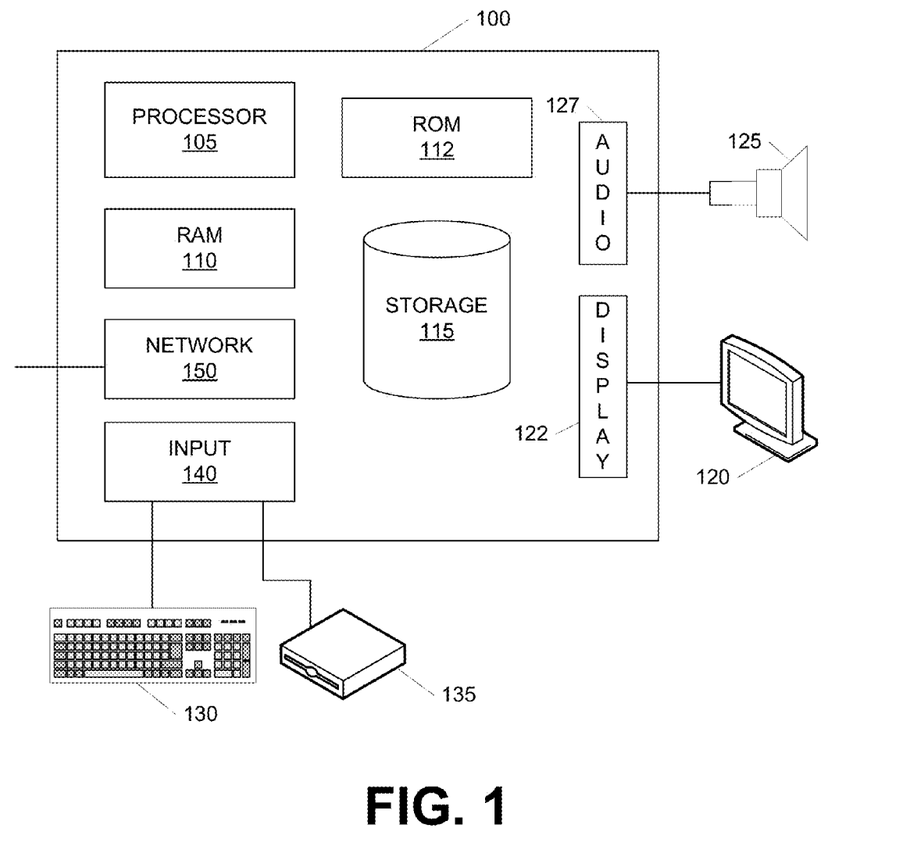
FIG. 1 illustrates a computing environment in which one or more aspects described herein may be implemented.

FIG. 1 illustrates a computing environment in which one or more aspects described herein may be implemented. A computing device such as computer 100 may house a variety of components for inputting, outputting, storing and processing data. For example, processor 105 may perform a variety of tasks including executing one or more applications, retrieving data from a storage device such as storage 115 and/or outputting data to a device such as display 120. Processor 105 may be connected to Random Access Memory (RAM) module 110 in which application data and/or instructions may be temporarily stored. RAM module 110 may be stored and accessed in any order, providing equal accessibility to the storage locations in RAM module 110. Computer 100 may further include Read Only Memory (ROM) 112 which allows data stored thereon to persist or survive after computer 100 has been turned off. ROM 112 may be used for a variety of purposes including for storage of computer 100's Basic Input/Output System (BIOS). ROM 112 may further store date and time information so that the information persists even through shut downs and reboots. In addition, storage 115 may provide long term storage for a variety of data including applications and data files. Storage 115 may include any of a variety of computer readable media such as disc drives, optical storage mediums, magnetic tape storage systems, flash memory and the like. In one example, processor 105 may retrieve an application from storage 115 and temporarily store the instructions associated with the application RAM module 110 while the application is executing.

Computer 100 may output data through a variety of components and devices. As mentioned above, one such output device may be display 120. Another output device may include an audio output device such as speaker 125. Each output device 120 and 125 may be associated with an output adapter such as display adapter 122 and audio adapter 127, which translates processor instructions into corresponding audio and video signals. In addition to output systems, computer 100 may receive and/or accept input from a variety of input devices such as keyboard 130, storage media drive 135 and/or microphone (not shown). As with output devices 120 and 125, each of the input devices 130 and 135 may be associated with an adapter 140 for converting the input into computer readable/recognizable data. In one example, voice input received through microphone (not shown) may be converted into a digital format and stored in a data file. In another example, credit card input may be received through a card reader (not shown) and converted into a digital format. In one or more instances, a device such as media drive 135 may act as both an input and output device allowing users to both write and read data to and from the storage media (e.g., DVD-R, CD-RW, and the like).

Computer 100 may further include one or more communication components for receiving and transmitting data over a network. Various types of networks include cellular networks, digital broadcast networks, Internet Protocol (IP) networks and the like. Computer 100 may include adapters suited to communicate through one or more of these networks. In particular, computer 100 may include network adapter 150 for communication with one or more other computer or computing devices over an IP network. In one example, adapter 150 may facilitate transmission of data such as electronic mail messages and/or financial data over a company or organization's network. In another example, adapter 150 may facilitate transmission or receipt of information from a worldwide network such as the Internet. Adapter 150 may include one or more sets of instructions relating to one or more networking protocols. For example adapter 150 may include a first set of instructions for processing IP network packets as well as a second set of instructions associated with processing cellular network packets. In one or more arrangements, network adapter 150 may provide wireless network access for computer 100.

One of skill in the art will appreciate that computing devices such as computer 100 may include a variety of other components and is not limited to the devices and systems described in FIG. 1.

Figure 2:
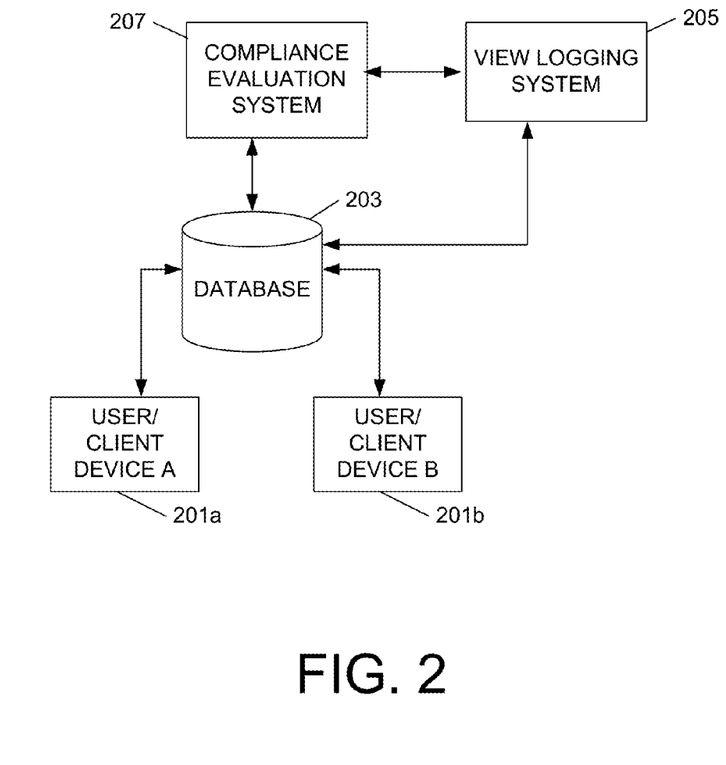
FIG. 2 illustrates an example network environment through which users may request data from a database according to one or more aspects described herein.

FIG. 2 illustrates an example network environment in which a database of information may be accessed and used for various purposes. For example, in a financial system, client devices 201a and 201b (e.g., computer 100 of FIG. 1) may request and retrieve customer data (e.g., personal information, financial information, account data, and the like) from database 203 by executing various pieces of computer-executable codes such as views. Each view may include a SQL script or series of commands in one particular example where database 203 corresponds to a SQL database. The view may be executable by a view generator that is configured to process view code (e.g., SQL code). Other types of database languages and structures may be used as desired or needed. Database 203 may store additional or alternative data including other types of company or organization information such as employee data, scheduling information, inventory information and the like. Database 203 may store multiple data records with each record having multiple attributes. For example, if each record represents a customer of a company, the record attributes may include name, contact information, account number and the like. According to another aspect, database 203 or one or more of compliance valuation system 207 and view logging system 205 may further store a catalog of views that are available for execution by users of the systems 207 and 205. The catalog may store a list of all available (e.g., retrievable and executable) views or all views including those that may be suspended or otherwise unavailable.

Upon a user accessing data in database 203, the access and retrieval of the data may be logged by view logging system 205. For example, view logging system 205 may be configured to detect execution of a view that retrieves data from database 203. The logged information may include an identifier (e.g., a name, ID number, address, username, and the like) of the user requesting the view, identification of the data retrieved, a time of the retrieval/access, a database accessed, whether a portion of all of the data retrieved was masked (e.g., rendered unviewable) from the requesting user and the like. Data may be masked if privacy settings or conditions require protection of the data from view by certain individuals, types of individuals, organizations, groups and the like. For example, to identify the individual or type of requesting individual, the user may be required to login or otherwise identify and authenticate themselves through client devices 201a and/or 201b in conjunction with requesting data from database 203. Accordingly, data that the user has permission to view and does not have permission to view may be determined by client devices 201a or 201b or database 203 once the user has logged in and/or been authenticated. In some arrangements, privacy might only be required for certain attributes or certain records. Thus, while some portions of the requested data are viewable, other portions might be hidden from the requesting user's view (e.g., by replacing the data with "XXXX", leaving the data blank or the like). If a user is not authorized to view one or more portions of the requested data, those portions might not be requested by the client device 201a or 201b or returned by the database 203.

In some instances, a view might not include privacy code even though privacy requirements are defined for the data that the view is configured to retrieve. In order to identify such non-compliant views, compliance evaluation system 207 may be configured to analyze the views to determine whether the views comply with currently defined privacy requirements. In one example, evaluation system 207 may parse an activity log generated by the view logging system 205 to identify the data (and type of data) retrieved by a user using a particular view. The evaluation system 207 may then determine whether any privacy requirements were violated by the information provided to the user in view of the privacy requirements. In another example, evaluation system 207 may parse or otherwise analyze the executable code of the view to identify the types of data that the view is configured to retrieve and to subsequently determine whether privacy requirements exist for those types of data. If so, the evaluation system 207 may subsequently determine whether privacy code exists in the view to enforce those privacy requirements. Additional details of determining whether a view is privacy-compliant are provided below.

Each of evaluation system 207, database 203 and view logging system 205 may be a separate computing system connected through a network. Alternatively, two or more of evaluation system 207, view logging system 205 and database 203 may be part of the same computing device or system. For example, database 203 may be stored within evaluation system 207 or view logging system 205.

Figure 3:
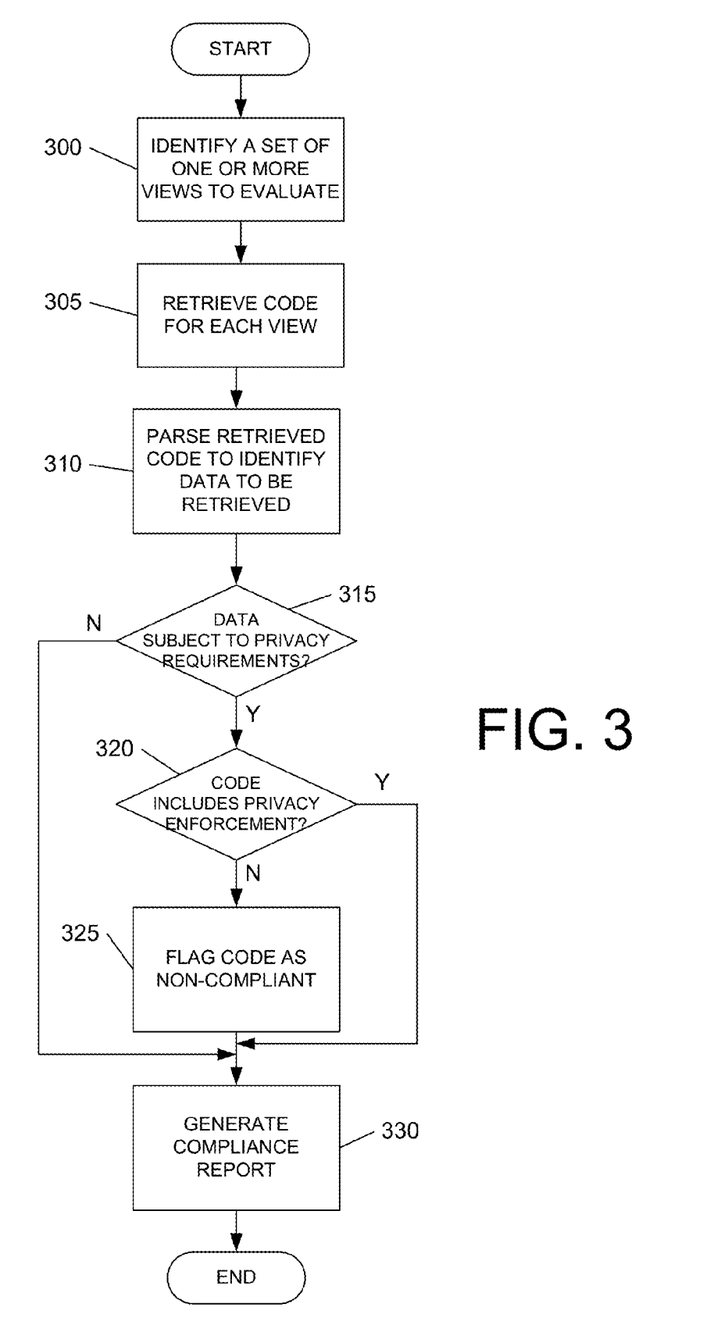
FIG. 3 is a flowchart illustrating an example method for identifying non-compliance in data retrieval according to one or more aspects described herein.

FIG. 3 is a flowchart illustrating an example process by which views may be evaluated for privacy protection compliance. In step 300, a compliance evaluation system may identify a set of views to review. The set of views may be all views available to users or may be a subset of all views (e.g., views used by a particular organization, views created by one or more particular authors, views configured to retrieve data from one or more particular databases or tables). As noted herein, views or identification of views may be stored in a catalog or database. In one example, the views may be identified from the catalog (e.g., evaluate all views in the catalog). In another example, only certain views may be retrieved from the catalog for evaluation purposes based on a filter or other specified criteria. According to some arrangements, a copy of the catalog may be used for view identification and evaluation purposes. The catalog may be copied based on a predefined schedule such as based on an amount of time (e.g., every hour, 30 minutes, 10 minutes, 2 hours, 6 hours, 12 hours, 24 hours, week, two days, month, and the like), a condition being satisfied (e.g., a new view being added, a view being changed, any type of update to the catalog, and the like) and/or upon demand (e.g., upon initiation of a compliance evaluation). Once the views to be evaluated have been identified, the compliance evaluation system may retrieve the code for each view in step 305. For example, for views operating against SQL databases, the SQL code of each view may be retrieved. The code may be stored in the catalog or in another database. In one example, the view identification information retrieved from the catalog may be used to retrieve the corresponding code from a code database.

In step 310, the compliance evaluation system may parse the view code to identify the data the view is configured to retrieve. For example, in SQL databases, the data may be identified using field (e.g., column, row, record, and the like) and/or table identifiers specified in the code. Subsequently, the compliance evaluation system may determine whether any of the data is subject to privacy protection and requirements in step 315. Determining whether any of the data to be retrieved is subject to privacy requirements may include querying a database of privacy requirements using the data as a key. Privacy requirements may be based on whether data is retrieved (e.g., returned by a database to the requesting device) and/or whether the data is displayed. In some instances, a privacy violation may occur where the data is displayed, while the retrieval or return of data might not amount to a violation. In other cases, the retrieval or return of data may be a violation regardless of whether the data was viewed. Various other methods of storing and determining privacy requirements may be used.

If any of the data is subject to privacy requirements a system may determine, in step 320, whether the code corresponding to each privacy protected piece of data in the view includes privacy enforcement code. For example, the view may include statements (e.g., CASE or IF statements for SQL code) configured to allow retrieval of the data only if one or more conditions are satisfied. In a particular example, retrieval of data may be conditioned on the requesting user being authorized to view and/or access the information. Alternatively or additionally, the view may include code conditioning display of the privacy protected data on one or more requirements being satisfied. If none of the data is subject to privacy protection or requirements, the system may proceed to analyze another view, if any. If no other views exist, the system may proceed to generate a compliance report as shown in step 330.

If privacy protection code does not exist in the view and the data is subject to privacy requirements, the compliance evaluation system may flag the view as non-compliant in step 325. Additionally, the date on which non-compliance was detected may also be recorded. In some arrangements, the compliance evaluation system may also suspend availability and accessibility of the view, notify one or more entities of the non-compliance and/or require correction by a certain deadline. The process of 305-325 may be repeated for each identified view. The compliance evaluation system may further generate a compliance report identifying all views that were non-compliant in step 330. For example, the report may provide statistical data specifying a number or percentage of non-compliant views overall, non-compliant views per department or organization, execution of non-compliant views and the like. The report may also be generated specifically for a requesting user or organization and may differ depending on the requesting entity. For example, if a user from department 1 requests the report, only statistics for views generated or executed by department 1 may be reported. Alternatively, the system may generate the same report for all requesting viewers.

Figure 4A:
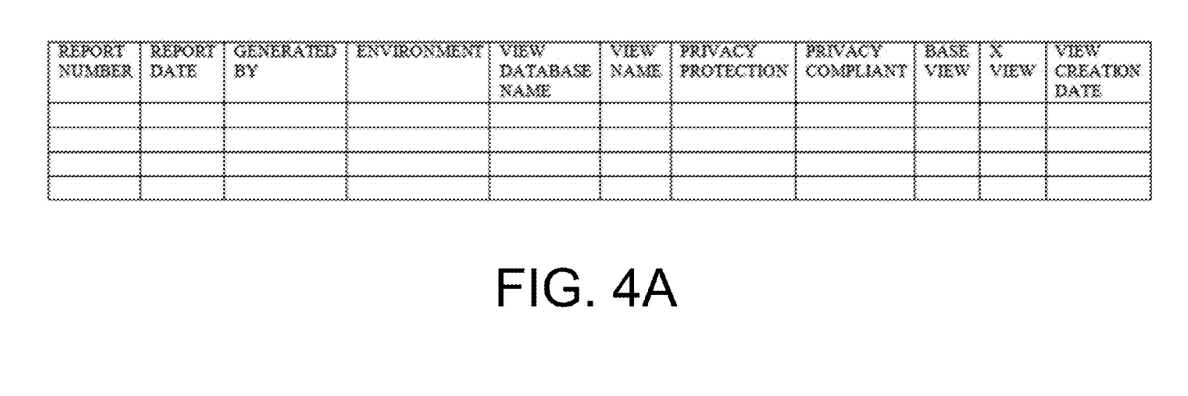
FIGS. 4A and 4B illustrate portions of an example privacy auditing report according to one or more aspects described herein.
Figure 4B:
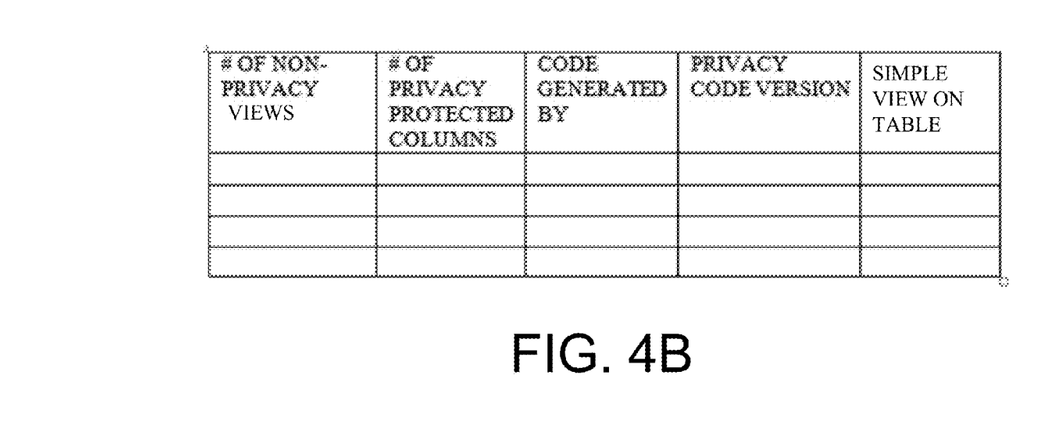

FIGS. 4A and 4B illustrate example portions of a privacy audit report that may be generated as a result of the process described in FIG. 3. In FIG. 4A, for example, the report may include identification information such as a report number, a report date and identification of an entity that generated or requested generation of the report. The report number may correspond to a unique identifier associated with each view that was audited during the compliance evaluation process while the report date may indicate when the audit or evaluation of that view was performed. An environment field may be populated with the name or identifier of an operating environment or system in which the view was evaluated or executed. For example, some organizations may provide a testing environment in which new code, software, systems and the like are tested prior to deployment into a public operating environment or system used in everyday operations. The various environments may be structured such that execution in one environment might not affect operations and functionality in another environment. Accordingly, the report may specify the particular environment in which the view was evaluated.

The report may further identify a database that the view is configured to retrieve data from and a name of the view as further illustrated in FIG. 4A. An organization may have multiple databases storing different types or categories of data. For example, each department in a financial institution may have its own database. For each view, the report may further indicate whether the view includes privacy protection and whether the view is privacy compliant. In particular, a view may include privacy code; however, if the privacy code is not sufficient based on privacy requirements, the view may be non-compliant. The portion of the report shown in FIG. 4A further includes an indication of whether the view corresponds to a base view or an X view, where base views are generally exempt from privacy controls and X views are views with at least one record attribute (e.g., columns in a table) removed or otherwise hidden from view. The report may further indicate a date of creation of the view.

A second portion of the report, as illustrated in FIG. 4B, is configured to specify a number of non-privacy views and a number of privacy protected columns. For example, the report may indicate the number of record attributes (e.g., columns in a table) retrieved by the corresponding view that are subject to privacy protection. This may provide a reviewer with some insight into the potential severity of a lack of privacy enforcement for a particular view. Additionally, the number of non-privacy views may indicate whether a database of views is particularly problematic given a number of views that do not have privacy enforcement but that should. Additionally, the portion of the report may also identify the privacy code version and an author of the code. The simple view on table field may identify whether the view corresponds to a complete view of a table without any restrictions or filtering. In some arrangements, the report may further indicate a number of executions of the view to provide a sense of how often or popular the view is. If a non-compliant view is used often, the severity of the non-compliance may be higher. Similarly, if a non-compliant view is used less often, the severity of the non-compliance may be lower.

Figure 5:
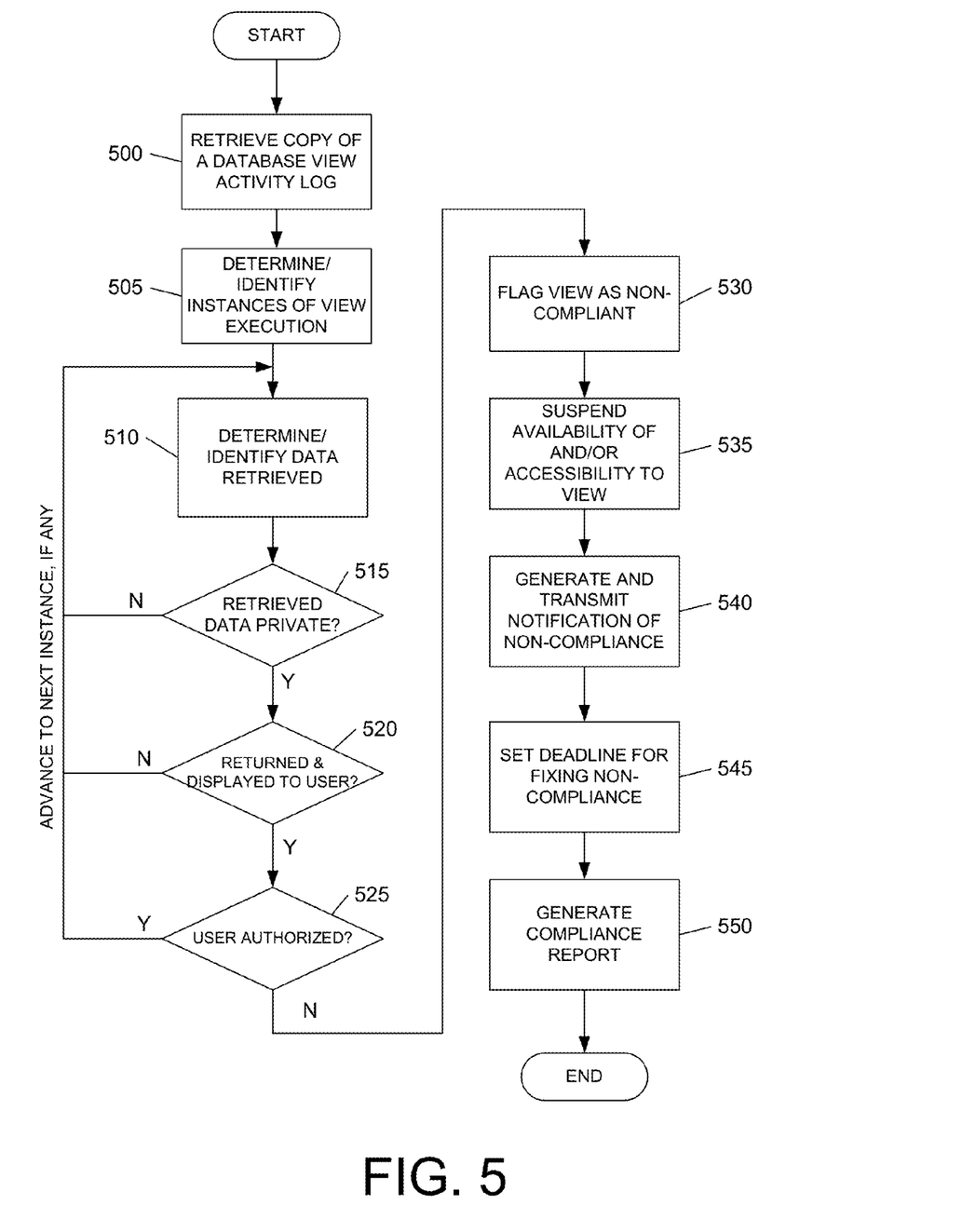
FIG. 5 is a flowchart illustrating an example method for determining privacy compliance according to one or more aspects described herein.

FIG. 5 is a flowchart illustrating another example process for evaluating privacy compliance of data access code such as views. In step 500, for example, a system such as evaluation system 207 (FIG. 2) may retrieve a copy of a database view activity log. Retrieval of the copy may include causing a copy of the view activity log to be generated on-demand and/or obtaining a pre-generated copy of the log. Copies of the view activity log may be generated based on a specified schedule such as daily at a predefined time, once every specified time period (e.g., 6 hours, 12 hours, 30 minutes, 2 hours, and the like), once every specified number of view requests and the like. In some arrangements, the original activity log (e.g., a non-copied version) may be used instead.

In step 505, the system may determine and identify, based on the retrieved activity log or copy, instances of views being executed by users. For example, the system may parse the activity log for key words signifying the execution of a view. Subsequently, for each identified execution of a view, the system may determine the data retrieved from the database in step 510. Again, the system may make such a determination based on the activity log since, as noted, the activity log may specify the data and types of data that were retrieved. Once the system has identified the data retrieved, the system may, in step 515, determine whether any of the retrieved data is subject to privacy protection requirements. For example, the system may compare the data retrieved to a list of records, record attributes and the like that require privacy protection. In one arrangement, records may correspond to each row in a table while each record attribute corresponds to the table columns. Accordingly, the system may determine if any of the retrieved/returned data includes protected records or protected record attribute data. In one example, the list of records and record attributes that are privacy protected may be determined by identifying flagged records and attributes in the database or table stored in the database (e.g., database 203 of FIG. 2). The list of privacy protected records and attributes may thus be generated on-demand, if desired. Alternatively, the list of privacy protected records may be pre-generated and stored with the specific table or database.

If none of the data retrieved for the view is privacy protected, the system may return to step 510 for the next identified instance of view execution. That is, the executed view might not be labeled or identified as a non-compliant view. If, however, any of the data retrieved for the view is privacy protected, the system may determine in step 520 whether the data was returned and displayed to the requesting user. In some instances, data may be returned but might not be displayed to the requesting user. Alternatively, the data may be hidden (e.g., blacked out or replaced with ambiguous characters such as "XXXXX") upon display. In other instances, if data is returned to the requesting device and user, the system may assume that the data was displayed to the requesting user. If the system determines that the data was not returned and/or displayed to the requesting user, the system may similarly return to step 510 for the next identified instance of view execution and the view might not be labeled/identified as a non-compliant view.

However, if the data was returned and displayed to the requesting user (e.g., without masking), the system may determine whether the user was authorized to view the data in step 525. In one example, the system may compare the user's authorization level with an authorization level required for viewing each of the privacy-protected records or record attributes. In a particular example, each user may be associated with a list of data that he or she is authorized to view. Accordingly, this list may be compared to the data that was returned to make the above determination of step 525. In another particular example, the user may be associated with a particular authorization level (e.g., on a scale of low-high, 1-10, and the like) and privacy-protection may be identified with a corresponding authorization level. Other attributes may also be determinative of whether a user is authorized to view the data. For example, data may be privacy-protected by organization. That is, one organization (e.g., a department within a company) may be authorized to view consumer phone numbers while another organization (e.g., another department within the same company) might not have such authorization. Accordingly, privacy settings may be defined by organization. A user's associated organizations may then be compared to authorized organizations for privacy compliance.

If the system determines that the user is authorized to view the retrieved and displayed data, the system may return to step 510 for the next identified instance of view execution and the view might not be labeled/identified as a non-compliant view. However, if the user was not authorized to view the retrieved data, the system may flag the executed view responsible for retrieving and displaying the data as non-compliant in step 530. In one example, a flag indicator may be stored as metadata in association with the view in a database of views. In another example, a flag may take the form of comments added into the executable code of the view. Various other methods for flagging the view may be used.

Alternatively or additionally, the system may suspend availability of and/or accessibility to the non-compliant view in step 535. Thus, a user might not be able to access, identify or execute the view upon suspension. In one particular example, the system may move the view to a holding database or storage area that is non-accessible to general users (e.g., users other than administrators or personnel responsible for addressing non-compliance). The system may further generate and transmit a notification of the non-compliance in step 540 to one or more entities such as an individual or department responsible for creating the view, personnel responsible to resolving non-compliance issues and the like. The notification may, in some instances, include a requirement that the view be fixed prior to re-inserting the view back into normal operations (e.g., accessible and executable). Accordingly, the system may set, in step 545, a deadline for fixing the view. The deadline may be enforced by deleting the view if the deadline is not met. Alternatively, if the deadline is not met, the system may escalate the problem to another entity higher in a predefined resolution hierarchy. Other responses and actions may be used for breach of the deadline as desired or necessary. In some examples, once the view is fixed, the date of remediation may be recorded in a database.

In step 550, the system may further generate a compliance report identifying non-compliant views and providing various compliance statistics upon evaluating all of the instances in the activity log. The report may include information similar to that described above with respect to step 330 of FIG. 3.

In some arrangements, the return of privacy protected data may be considered a violation of privacy requirements. Accordingly, compliance may also be evaluated based on whether privacy protected data was returned, even if the data was not displayed. For example, step 520 may correspond to determining whether the data was returned to the user (or requesting device), rather than returned and displayed.

Figure 6:
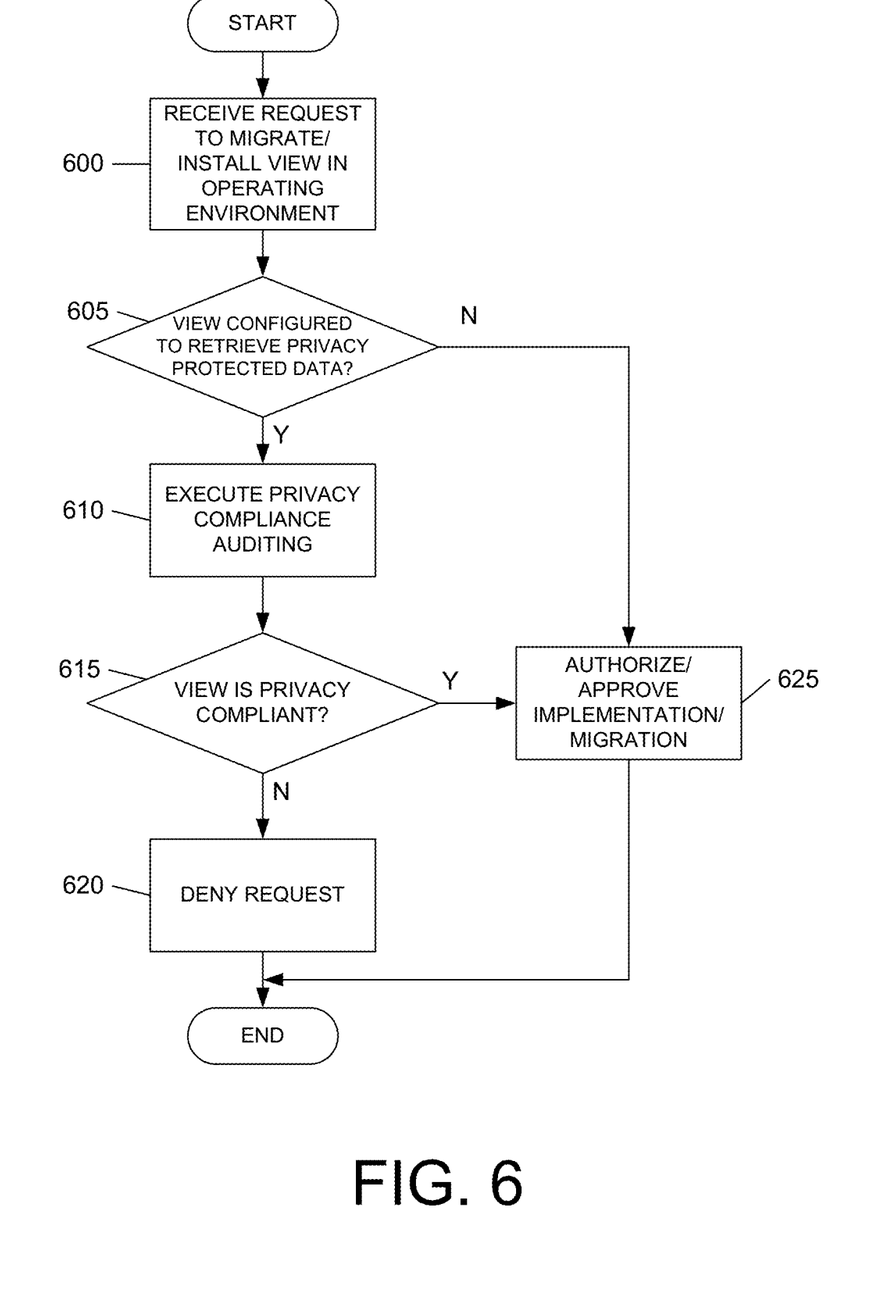
FIG. 6 is a flowchart illustrating an example method for triggering privacy or security auditing according to one or more aspects described herein.

In one or more configurations, compliance auditing of a view may be automatically triggered upon receiving a request to implement the view in a live operating environment (e.g., in contrast to testing or development environments). FIG. 6 illustrates an example process whereby views are automatically processed upon receiving of such requests. In step 600, a view migration or implementation system may receive a request to migrate or install a view in a live operating environment. In some instances, the request may correspond to migrating or installing a view from a testing or development environment into a live platform that is used in ordinary day-to-day operations. In response to the request, the system may determine, in step 605, whether the view is configured to retrieve privacy protected data. If not, the system may authorize or approve of the requested implement and/or migrate the view into the live environment in step 625. If, on the other hand, the view is configured to retrieve privacy protected data, the system may execute privacy compliance auditing of the view in step 610.

Upon completion of the audit, the system may subsequently determine whether the view is privacy compliant in step 615. If so, the system may authorize implementation and/or migration as in step 625. If, however, the view is not privacy compliant, the request may be denied in step 620. Additionally or alternatively, a notification of the denial may be sent to a requesting user with a reason for the rejection.

In some arrangements, the catalog or inventory of views may be initially categorized according to those views that require privacy protection and those views that do not require privacy protection. Accordingly, only those views that require privacy protection may be evaluated for privacy compliance. In some instances, a view may require privacy protection, but may have a waiver. As such, those views may be provided with a flag or other indicator to signify the waiver.

The above processes, systems, devices and computer readable media may be used for evaluating privacy protections in a variety of arenas. For example, financial records for customers may be sensitive. Accordingly, a financial institution may wish to evaluate database views to insure appropriate customer protections. In another example, internal memoranda and the like may be subject to secrecy and thus require protection. As such, code configured to access data from a common database may be evaluated to determine compliance with privacy requirements for the various types of data stored therein.

The methods and features recited herein may further be implemented through any number of computer readable media that are able to store computer readable instructions. Examples of computer readable media that may be used include RAM, ROM, EEPROM, flash memory or other memory technology, CD-ROM, DVD, or other optical disk storage, magnetic cassettes, magnetic tape, magnetic storage and the like. The computer readable instructions may be executed by one or more processors (e.g., multi-core processor or multi-processor systems) to cause an apparatus such as a computing device to perform various tasks, functions and the like.

While illustrative systems and methods as described herein embodying various aspects are shown, it will be understood by those skilled in the art that the invention is not limited to these embodiments. Modifications may be made by those skilled in the art, particularly in light of the foregoing teachings. For example, each of the elements of the aforementioned embodiments may be utilized alone or in combination or subcombination with elements of the other embodiments. It will also be appreciated and understood that modifications may be made without departing from the true spirit and scope of the present invention. The description is thus to be regarded as illustrative instead of restrictive on the present invention.

We claim:

1. A method comprising:
    evaluating, by a computing system having at least one processor, a database storing a plurality of data records to identify one or more data records or record attributes, each of the one or more data records or record attributes associated with predefined privacy protection requirements;
    determining that a view of the database is configured to retrieve the identified one or more data records or record attributes associated with the predefined privacy protection requirements, wherein the view includes executable code for retrieving database information;
    determining whether privacy-setting executable code configured to enforce the predefined privacy protection requirements is present in or absent from the view; and
    in response to determining that the privacy-setting executable code is absent from the view:
    registering the view in a privacy-compliance log;
    suspending an ability for a plurality of users to execute the view, wherein the plurality of users comprises at least one user authorized to access the one or more data records or record attributes associated with the predefined privacy protection requirements;
    generating a notification that the view does not include the privacy-setting executable code;
    setting a deadline for correcting the view to include the privacy-setting executable code; and
    enforcing the deadline for correcting the view to include the privacy-setting executable code by deleting the view in response to determining that the deadline has passed without the view being corrected to include the privacy-setting executable code.

2. The method of claim 1, wherein each of the one or more data records or record attributes associated with predefined privacy protection requirements is further associated with an authorization level required to access the respective data record or record attribute, and wherein determining whether the privacy-setting executable code configured to enforce the predefined privacy protection requirements is present in or absent from the view includes:
    determining whether the privacy-setting executable code is configured to, upon execution, evaluate whether an executing user is authorized to view the one or more data records or record attributes associated with the predefined privacy protection requirements by comparing an authorization level of the executing user to the authorization level of the data record or record attribute.

3. The method of claim 1, wherein determining whether the privacy-setting executable code configured to enforce the predefined privacy protection requirements is present in or absent from the view includes:
  determining, based on an activity log recording a plurality of view executions, views executed by one or more users; and
  for each of the executed views:
    determining whether the executed view included the identified one or more data records or record attributes associated with the predefined privacy protection requirements; and
    in response to determining that the view included the identified one or more data records or record attributes associated with the predefined privacy protection requirements, determining whether a corresponding user executing the view is authorized to view the identified one or more data records or record attributes associated with the predefined privacy protection requirements.

4. The method of claim 3, wherein determining, based on the activity log, that the view was executed by the user includes examining a copy of the activity log.

5. The method of claim 1, further comprising generating a report specifying a number of views of a plurality of views that are required to have privacy-setting executable code, but do not have privacy-setting executable code.

6. An apparatus comprising:
  at least one processor; and
  memory storing computer-readable instructions that, when executed, cause the apparatus to:
    evaluate a database storing a plurality of data records to identify one or more data records or record attributes requiring privacy protection;
    determine that a view of the database is configured to retrieve the identified one or more data records or record attributes requiring privacy protection, wherein the view includes executable code for retrieving database information;
    determine whether privacy-setting executable code configured to enforce the required privacy protection is present in or absent from the view; and
    in response to determining that the privacy-setting executable code is absent from the view:
    register the view in a privacy-compliance log;
    suspend an ability for a plurality of users to execute the view, wherein the plurality of users comprises at least one user authorized to access the one or more data records or record attributes requiring privacy protection;
    generate a notification that the view does not include the privacy-setting executable code;
    set a deadline for correcting the view to include the privacy-setting executable code; and
    enforce the deadline for correcting the view to include the privacy-setting executable code by deleting the view in response to determining that the deadline has passed without the view being corrected to include the privacy-setting executable code.

7. The apparatus of claim 6, wherein each of the one or more data records or record attributes requiring privacy protection is further associated with an authorization level required to access the respective data record or record attribute, and wherein determining whether the privacy-setting executable code configured to enforce the required privacy protection is present in or absent from the view includes:
  determining whether the executable code is configured to, upon execution, evaluate whether an executing user is authorized to view the one or more data records or record attributes by comparing an authorization level of the executing user to the authorization level of the data record or record attribute.

8. The apparatus of claim 6, wherein determining whether the privacy-setting executable code configured to enforce the required privacy protection is present in or absent from the view includes:
  determining, based on an activity log, that the view was executed by a user;
  determining that the view included the identified one or more data records or record attributes requiring privacy protection; and
  determining that the user is not authorized to view the identified one or more data records or record attributes requiring privacy protection.

9. The apparatus of claim 6, the memory storing further instructions for generating a report specifying a number of views of a plurality of views that are required to have privacy-setting executable code, but do not have privacy-setting executable code.

10. One or more non-transitory computer-readable media storing computer-readable instructions that, when executed, cause an apparatus to:
  evaluate a database storing a plurality of data records to identify one or more data records or record attributes, each of the one or more data records or record attributes associated with predefined privacy protection requirements;
  determine that a view of the database is configured to retrieve the identified one or more data records or record attributes associated with the predefined privacy protection requirements, wherein the view includes executable code for retrieving database information;
  determine whether privacy-setting executable code configured to enforce the predefined privacy protection requirements is present in or absent from the view; and
  in response to determining that the privacy-setting executable code is absent from the view:
  register the view in a privacy-compliance log;
  suspend an ability for a plurality of users to execute the view, wherein the plurality of users comprises at least one user authorized to access the one or more data records or record attributes associated with the predefined privacy protection requirements;
  generate a notification that the view does not include the privacy-setting executable code;
  set a deadline for correcting the view to include the privacy-setting executable code; and
  enforce the deadline for correcting the view to include the privacy-setting executable code by deleting the view in response to determining that the deadline has passed without the view being corrected to include the privacy-setting executable code.

11. The one or more computer-readable media of claim 10, wherein each of the one or more data records or record attributes associated with predefined privacy protection requirements is further associated with an authorization level required to access the respective data record or record attribute, and wherein determining whether the privacy-setting executable code configured to enforce the predefined privacy protection requirements is present in or absent from the view includes:
  determining whether the executable code is configured to, upon execution, evaluate whether an executing user is authorized to view the one or more data records or record attributes associated with the predefined privacy protection requirements by comparing an authorization level of the executing user to the authorization level of the data record or record attribute.

12. The one or more computer-readable media of claim 10, wherein determining whether the privacy-setting executable code configured to enforce the predefined privacy protection requirements is present in or absent from the view includes:
   determining, based on an activity log, that the view was executed by a user;
   determining that the view included the identified one or more data records or record attributes associated with the predefined privacy protection requirements; and
   determining that the user is not authorized to view the identified one or more data records or record attributes associated with the predefined privacy protection requirements.

13. The one or more computer-readable media of claim 10, further comprising instructions for generating a report specifying a number of views of a plurality of views that are required to have privacy-setting executable code, but do not have privacy-setting executable code.

14. The one or more computer-readable media of claim 13, wherein the privacy-setting executable code includes computer-executable code conditioning at least one of retrieval and display of privacy-protected data on one or more privacy requirements.

15. The method of claim 1, further comprising:
   auditing the view to determine whether the view of the database is configured to retrieve the identified one or more data records or record attributes associated with the predefined privacy protection requirements.

* * * * *